Dec. 20, 1960   J. B. CARRIER   2,965,094
SAWING APPARATUS
Filed Dec. 5, 1958   2 Sheets-Sheet 1
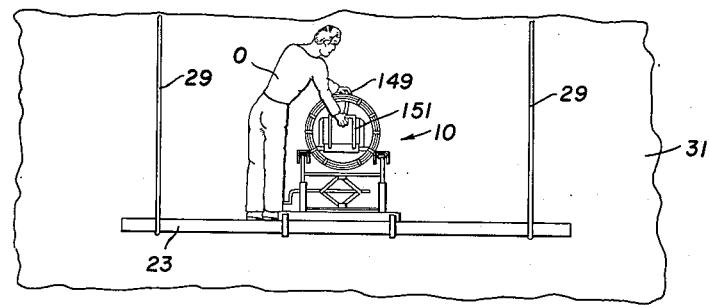
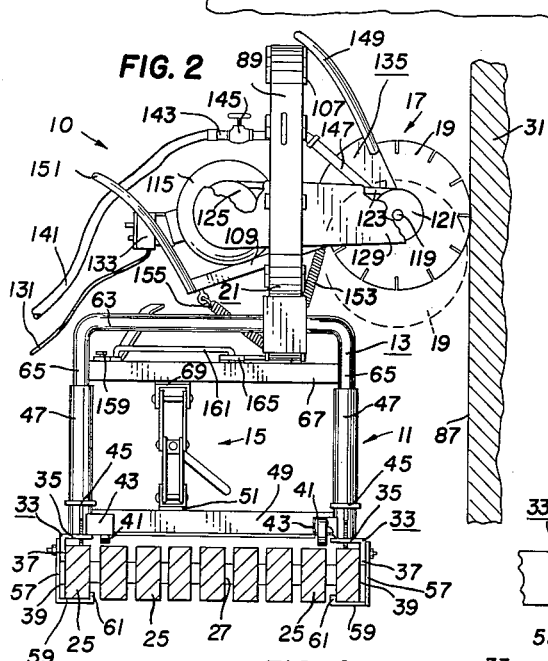
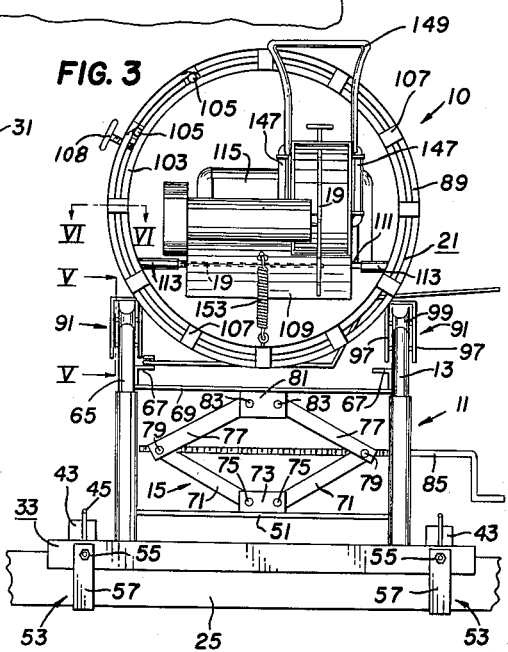
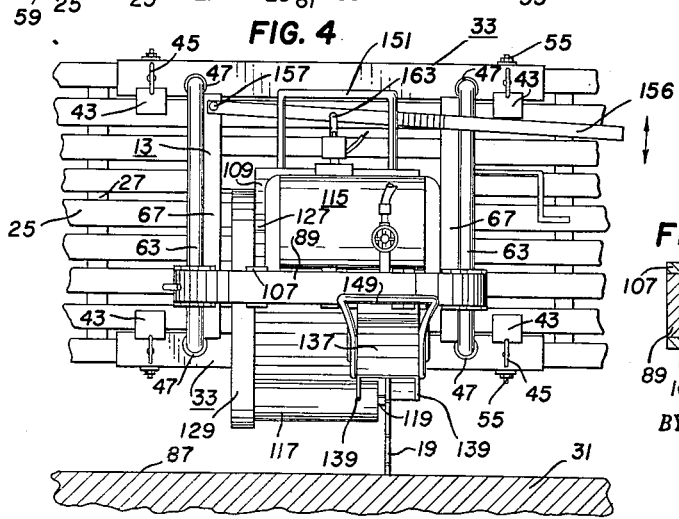
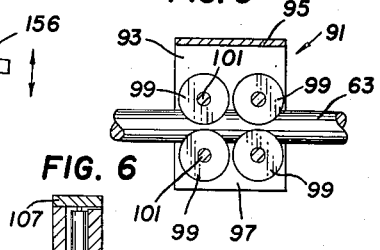
INVENTOR.
JOE B. CARRIER
BY John R. Walker, III
Attorney Dec. 20, 1960     J. B. CARRIER     2,965,094
SAWING APPARATUS
Filed Dec. 5, 1958     2 Sheets-Sheet 2
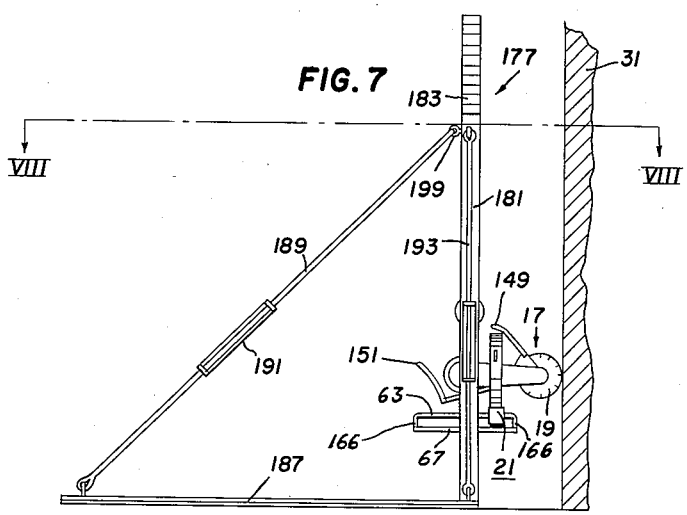
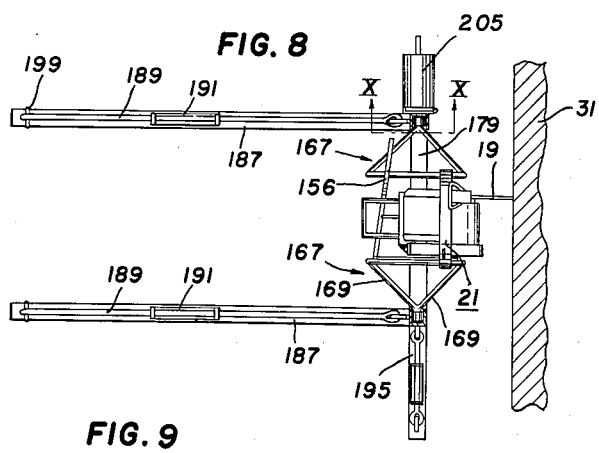
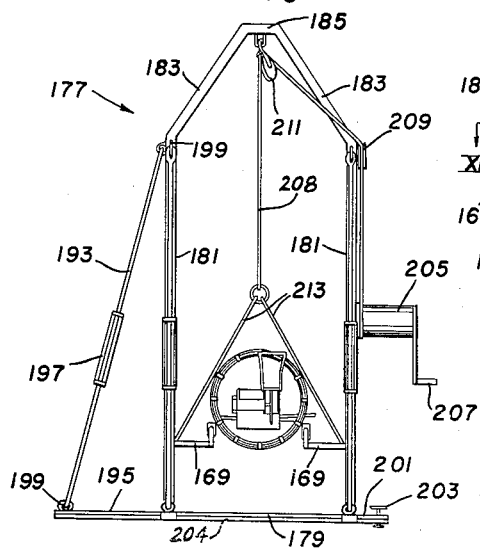
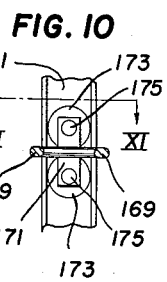
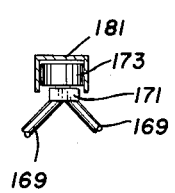
INVENTOR.
JOE B. CARRIER
BY
*John R. Walker, III*
Attorney United States Patent Office 2,965,094
Patented Dec. 20, 1960

2,965,094
SAWING APPARATUS
Joe B. Carrier, 98 S. Humes, Memphis, Tenn.
Filed Dec. 5, 1958, Ser. No. 778,458
13 Claims. (Cl. 125—14)

This invention relates to sawing apparatus and especially to masonry sawing apparatus for cutting vertical walls of brick, stone, tile and similar materials.

Heretofore, the job of cutting holes in vertical walls has been a time-consuming and laborious task. For example, in order to install in an existing building the type of heating and air-conditioning unit which is housed in a hole through the outer wall of the building, it is necessary in many cases to cut through tough materials as brick, stone, tile, and the like to form the hole. Heretofore, to do this the worker, working on a scaffold, had to handle a portable saw which was extremely difficult and many times would take several hours to cut one hole. In addition, the edges of the hole would be uneven due to the worker's inability to hold the portable saw straight, which unevenness greatly detracted from the beauty of the building.

Thus, one of the objects of the present invention is to provide sawing apparatus for cutting vertical walls in a quick, efficient, accurate, and easy manner.

A further object is to provide such apparatus wherein the cutting blade is mounted so that it may be turned to any desired angle for cutting the vertical wall.

A further object is to provide such apparatus having means for mounting on a scaffold so that the apparatus may be moved therealong and may be set at any desired position thereon.

A further object is to provide in such an apparatus means for adjusting the vertical height of the saw blade.

A further object is to provide in such apparatus means for moving the saw blade into and out of a wall-engaging position.

A further object is to provide such apparatus wherein the cutting blade is rockably mounted for rocking movement in the plane of the blade.

A further object is generally to improve the design and construction of sawing apparatus.

Other objects and a fuller understanding of this invention may be had by referring to the following description and claims, taken in conjunction with the accompanying drawings, in which:

Fig. 1 is a view showing the device mounted on a scaffold and showing the device being used to cut a vertical wall.

Fig. 2 is an enlarged side elevational view of the sawing apparatus of the present invention shown in engagement with a fragmentary portion of the wall, with portions being broken away for illustration purposes, and with the scaffold being shown in section.

Fig. 3 is a front elevational view of the device of Fig. 2 viewed from the wall looking outwardly and with portions being broken away for purposes of illustration.

Fig. 4 is a top plan view of the same.

Fig. 5 is a further enlarged fragmentary sectional view taken as on the line V—V of Fig. 3.

Fig. 6 is a sectional view on the scale of Fig. 5 taken as on the line VI—VI of Fig. 3.

Figs. 7, 8, and 9 are on a reduced scale.

Fig. 7 is a side elevational view of the sawing apparatus with a modified elevating means and showing the saw blade in engagement with the vertical wall.

Fig. 8 is a sectional view taken as on the line VIII—VIII of Fig. 7, with parts being removed for purposes of clarity.

Fig. 9 is a front elevational view of the device of Fig. 7, looking from the wall outwardly.

Fig. 10 is an enlarged fragmentary sectional view taken as on the line X—X of Fig. 8.

Fig. 11 is a fragmentary sectional view taken as on the line XI—XI of Fig. 10.

Referring now to the drawings in which the various parts are indicated by numerals, the preferred form of the sawing apparatus 10 of the present invention, which is shown in Figs. 1 through 6, comprises, in general, a carriage 11, a frame 13 carried by carriage 11 and adapted for vertical movement relative to the carriage, a jack 15 interposed between carriage 11 and frame 13 for vertically positioning the frame, a power saw 17 including a circular blade 19, and a supporting means or assembly 21 for supporting saw 17 from frame 13.

Referring now more specifically to carriage 11, the carriage is adapted to be used in conjunction with a scaffold 23 which may be of the well-known type including spaced elongated beams 25 held together by members 27 and which scaffold includes the usual lines 29 suspended from the upper part of a building to support the scaffold adjacent a vertical wall 31 of the building in the manner best shown in Fig. 1. Carriage 11 includes a pair of spaced, inwardly-facing, and parallel angle members 33, each having a horizontal flange 35 and a depending flange 37. Depending flanges 37 are respectively adapted to be positioned adjacent the outer side faces 39 of the outer ones of beams 25 in the manner best shown in Figs. 2, 3, and 4 so as to keep carriage 11 on scaffold 23 when the carriage is rolled therealong as hereinafter described. Carriage 11 is adapted to be rollingly supported from scaffold 23 as by wheels 41. Each of wheels 41 is rotatably mounted from a housing bracket 43 which, in turn, is fixedly mounted on angle member 33. Wheels 41 extend below horizontal flanges 35 so that the wheels are adapted to engage scaffold 23 to rollingly support the carriage from the scaffold. The axes of wheels 41 extend transversely of scaffold 23 so that the wheels are positioned for the carriage to roll along the length of scaffold 23—that is, from right to left and from left to right, as viewed in Fig. 1.

A plurality of set screws 45 are threadedly engaged in threaded apertures in horizontal flanges 35 in order that the lower ends of the set screws can engage the upper surface of scaffold 23 and lift the carriage 11 so that wheels 41 are disengaged from the scaffold, as best seen in Fig. 2, whereupon it will be understood the carriage can no longer roll. It will be understood, of course, that the above-described lifting of the carriage is effected when it is desired to set the carriage in a selected position during the operation of the sawing apparatus of the present invention, as will be hereinafter more apparent. It will be further understood that, when it is desired to move carriage 11, set screws 45 are turned so that the wheels 41 again engage scaffold 23 whereupon the carriage may be moved to its new position. After the carriage is moved, the set screws are again turned to lift the carriage as above described. Carriage 11 additionally includes four upstanding upwardly opening hollow posts 47 rigidly mounted from angle members 33. Posts 47 are preferably arranged with a pair thereof mounted from one of angle members 33 in spaced relationship and the other pair thereof mounted from the other angle member diametrically opposite from said first pair of posts in the manner best shown in Fig. 4. Carriage 11, in addition, comprises suitable brace members to form a rigid structure. Thus, brace members 49 respectively extend between pairs of posts 47 and are rigidly attached thereto, and a member 51 extends between members 49 and is rigidly attached thereto.

A plurality of holding brackets 53 depend from angle members 33 and are attached thereto as by bolt means 55 or the like. Each of holding brackets 53 preferably comprises a depending portion 57, a horizontal portion 59 integrally formed adjacent the lower end of depending portion 57 and inwardly extending therefrom, and a relatively short vertical portion 61 integrally formed adjacent the inner end of horizontal portion 59 and upstanding therefrom, whereby each holding bracket is adapted to embrace an outer beam 25 in the manner best shown in Figs. 2 and 3, wherein it will be seen horizontal portion 59 extends along the bottom of the beam and vertical portion 61 extends upwardly along the inner face of the beam when the carriage is in a lifted position heretofore described so that the carriage will not overturn. In other words, when the carriage is lifted, the outer beams 25 are clamped between set screws 45 and holding brackets 53 to anchor the carriage in place.

Frame 13 includes a pair of spaced parallel horizontal rods 63. Each of rods 63 is provided with a pair of legs 65 integrally formed at the opposite ends thereof and depending therefrom. Legs 65 are telescopically received in posts 47 so that frame 13 is vertically movable relative to carriage 11. Additionally, frame 13 includes suitable brace means as angle members 67, each extending between a pair of legs 65, and a transverse member 69 extending between angle members 67, with the members 67, 69 and legs 65 being rigidly interconnected to establish the rigid frame structure.

Jack 15 is interposed between members 51 and 69 for lifting and lowering frame 13 relative to carriage 11. Jack 15 is preferably, though not necessarily, of the well-known diamond-shaped type of jack which includes a lower pair of links 71 respectively pivotally mounted from a lower bracket 73 adjacent the lower end thereof as at pivot point 75 and respectively pivotally mounted adjacent the upper ends thereof to the lower ends of a pair of upper links 77, as at pivot points 79, which upper links are respectively pivotally mounted adjacent the upper ends thereof to an upper bracket 81 as at points 83. It will be understood that brackets 73, 81 are the parts of the jack that are respectively attached to members 51, 69. Jack 15 additionally includes the usual threaded crank 85 which, when turned in one direction, causes pivot points 79 to be brought towards one another to extend the jack for lifting frame 13 and, when turned in the opposite direction, causes pivot points 79 to spread apart to retract the jack for lowering frame 13.

Referring now to the supporting means 21 of power saw 17, the supporting means, in general, includes means for moving power saw 17 forwardly and rearwardly, i.e., towards and away from wall 31; includes means whereby the power saw is rotatable about an axis parallel to circular blade 19 and normal to the vertical outer surface 87 of wall 31; and includes means whereby the power saw is rockable about an axis transverse of sawing apparatus 10, i.e., parallel to outer surface 87.

More specifically, supporting means 21 is described as follows: An outer ring 89 is movably carried from frame 13 for forward and rearward movement, i.e., in and out relative to wall 31, as by a pair of roller assemblies 91 respectively fixedly mounted from opposite sides of ring 89 adjacent the lower part thereof and respectively rollingly engaging rods 63. Each of roller assemblies 91 are substantially identical in construction and, therefore, the description of one to follow will suffice for both. Each of roller assemblies 91 comprises a bracket 93 including a horizontal top 95 and sides 97 respectively integrally formed with and depending from opposite side edges of top 95. Each of roller assemblies 91 additionally includes two pairs of rollers 99 rotatably mounted in bracket 93 as by means of pins 101 extending between opposite sides 97 and with the rollers being rotatably mounted thereon. Rollers 99 are arranged in two pairs, i.e., an upper pair which engage the top of rod 63 and a lower pair below the upper pair, which lower pair engage the lower part of the rod, as best seen in Fig. 5. The engaging faces of the rollers are concave, as best seen in Fig. 3, so as to conform to rod 63 and prevent tilting of outer ring 89 which, in turn, is fixedly mounted to brackets 93 as by welding or the like. Outer ring 89 encircles a concentric smaller inner ring 103 which is spaced therefrom. Inner ring 103 is rotatably mounted relative to outer ring 89 about an axis extending centrally of ring 89 and normal to vertical surface 87 as by means of rollers 105 disposed between the inner and outer rings in engagement with the inner ring and rotatably supported from the outer ring as by means of plates 107. Plates 107, which are fixedly attached to outer ring 89 as by welding or the like, are spaced around the periphery of the outer ring on opposite sides thereof and extend inwardly in overlapping relationship with inner ring 103 to prevent accidental removal of the inner ring from the outer ring. A set screw 108 extends through a threaded aperture in outer ring 89 and engages inner ring 103 to anchor the inner ring against movement relative to the outer ring. When it is desired to turn inner ring 103, it will be understood the set screw is turned to release the inner ring and when it is desired to again secure the inner ring the set screw is turned in the opposite direction to engage once again the inner ring.

Supporting means 21 additionally includes a platform 109 rockably mounted from inner ring 103 as by means of a pair of pins 111 respectively fixedly mounted on opposite side edges of platform 109 intermediate the ends thereof and outwardly extending therefrom into sleeves 113 which are fixedly mounted from inner ring 103. In other words, pins 111 are rotatable in sleeves 113 which, in turn, are fixedly mounted from the inner ring, whereby platform 109 is rockable about an axis transversely extending relative to the sawing apparatus 10, i.e., extending parallel to wall 31. Platform 109 supports power saw 17 with the motor 115 of power saw 17 being fixedly mounted on platform 109 intermediate the ends thereof and with the platform extending forwardly and upwardly to its place of attachment with the housing 117 of the shaft 119, upon which shaft circular blade 19 is mounted adjacent one end thereof. In other words, housing 117 is fixedly mounted adjacent the end of platform 109 and rotatably contains shaft 119 which extends therethrough. Shaft 119 is disposed in a plane which extends transversely of sawing apparatus 10 so that circular blade 19 is disposed in a plane extending forwardly and rearwardly. In other words, blade 19 is disposed perpendicular to outer surface 87 of wall 31. Shaft 119 is provided with a pulley 121 fixedly mounted on the end thereof remote from circular blade 19. A continuous drive belt 123 extends around pulley 121 and around another pulley 125 which is fixedly mounted on the end of the shaft 127 of motor 115. A casing 129 is preferably provided for pulleys 121, 125 and drive belt 123, and is supported from platform 109 by suitable means. Motor 115 is preferably an electric motor powered from an electrical source, not shown, through a cord 131 and turned off and on by a suitable switch 133. From the foregoing, it will be understood that, when motor 115 is turned on, shaft 127 rotates to rotate pulley 125 therewith which, in turn, rotates pulley 121 through drive belt 123, which pulley 121, in turn, rotates shaft 119 to rotate circular blade 19. Circular blade 19 is preferably, though not necessarily, of the well-known diamond type of blade wherein it is suitable for cutting masonry or the like. A guard 135 is preferably provided around the back portion of circular blade 19 and includes an arcuate back 137 having forwardly extending pie-shaped and spaced sides 139 disposed on either side of the circular blade. Guard 135 is attached to and supported from platform 109 and housing 117.

Means is preferably provided for supplying water to circular blade 19, which means preferably comprises a hose 141 extending from a source of water, not shown, to piping 143, which piping includes a cut-off valve 145. Piping 143 is divided adjacent the end thereof to provide pipe sections 147 leading on opposite sides of guard 135 and communicating with the interior of the guard with the open ends of pipe sections 147 being directed at the opposite sides of circular blade 19 to direct water thereon in the usual manner.

A forward handgrip 149 is coupled to platform 109 adjacent the forward part thereof as by fixedly mounting the handgrip on guard 135. A rearward handgrip 151 is fixedly mounted on platform 109 adjacent the rearward part thereof and extends substantially upwardly and rearwardly therefrom.

A forward tension spring 153 is attached adjacent one end to inner ring 103 and attached adjacent the opposite end thereof to platform 109 adjacent the bottom and forward part thereof. A rearward tension spring 155 is similarly attached at one end to inner ring 103 adjacent the attachment of forward spring 153 and extends rearwardly where it is fixedly attached to platform 109 adjacent the bottom rearward part of the platform. Springs 153, 155 are arranged to exert substantially opposing forces to balance platform 109 in the position shown in Fig. 2 when the device is not in use.

Motion transmission means is provided for moving supporting means 21 forwardly and rearwardly to carry circular blade 19 into and out of a sawing position, which motion transmission means preferably comprises a lever 156 pivotally mounted adjacent one end thereof from frame 13 at pivot point 157 as by a stud 159 mounted from one of angle members 67 and extending upwardly through an aperture in the end of the lever. Lever 156 is preferably of zig-zag construction, as best seen in Fig. 3, so as to overlie rod 63. A link 161 is pivotally coupled adjacent one end thereof to lever 156 as at 163 intermediate the ends of the lever and the link is pivotally coupled to outer ring 89 by suitable means, as an eyelet 165. From the foregoing, it will be understood that forward and rearward swinging movement of lever 156 back and forth in the directions of the double-end arrow in Fig. 4 will carry supporting means 21 forward and rearward to carry with it circular blade 19 forward and rearwardly into and out of engagement with wall 31.

It will be understood from the foregoing that when circular blade 19 is in a wall engaging or forward position the blade extends forwardly beyond the other parts of sawing apparatus 10, as best seen in Figs. 2 and 4. In other words, when in said forward position, blade 19 is the foremost part of the apparatus.

In operating the device of the present invention, lines 29 are manipulated to raise scaffold 23 to the general vicinity of the cut to be made in wall 31 and carriage 11 is rolled along scaffold 23 until in a position in vertical alignment with the place where the cut is to be made. Then set screws 45 are turned to set the carriage in place as heretofore described. Jack 15 is adjusted to position the saw 17 at the desired place in respect to its location vertically. Supporting means 21 is then rotated to turn circular blade 19 to the correct angle of cut. Thus, if a vertical cut is to be made, supporting means 21 is turned so that circular blade 19 is in a vertical plane, as best seen in Fig. 3. It will be understood, of course, that when supporting means 21 is turned, the entire portion of the device inside of outer ring 89 will turn—that is, supporting means 21 and power saw 17. Motor 115 is turned on and lever 156 is moved forwardly to carry circular blade 19 into engagement with wall 31. During the cutting operation the handgrips 149, 151 are grasped in the manner shown in Fig. 1 by the operator. Thus, as seen in this figure, the operator O is grasping forward handgrip 149 with his left hand and rearward handgrip 151 with his right hand. With the handgrips held as above described, the operator O rocks platform 109 up and down to carry the circular blade 19 up and down and make the vertical cut in the wall. To continue the vertical cut, it will be understood that jack 15 is moved either upwardly or downwardly, which will move the blade upwardly or downwardly in vertical alignment with the cut previously made and the cut continued from that point. If a square hole is to be made, the operator may move the carriage 11 along the scaffold 23 and make the other vertical cut for the other side of the hole and it will be understood that this cut will be perfectly parallel with the first cut made. Then, for the horizontal top and bottom of the square hole, set screw 108 is turned to release inner ring 103 and supporting means 21 is rotated until circular blade 19 is in a horizontal position, shown in broken lines in Fig. 3. Then, the set screw is turned in the opposite direction to secure supporting means 21 against movement relative to outer ring 89. It will be understood that when circular blade 19 is in this horizontal position the platform 109 will be rockable about a substantially vertical axis since in this position pins 111 and sleeves 113 are positioned in a substantially vertical position. With the device of the present invention in this position described, the horizontal cut is made by rocking platform 109 back and forth. The other horizontal cut is then made by changing the position of jack 15. As in the vertical cuts, it will be understood that the horizontal cuts will be perfectly parallel since the angle of the blade will not have to be moved.

From the foregoing, it will be understood that great accuracy can be had in the cutting of a vertical surface by the saw of the present invention and a great number of cuts which previously could not be accomplished by hand tools and the like can be accomplished with the present invention. Thus, it will be understood that a horizontal line may be accurately cut all the way across a wall by setting the scaffold 23 and blade 19 in a horizontal position and then rolling carriage 11 along the scaffold as the cut is being made. Also it will be understood that, if the scaffold is disposed at an angle relative to the horizontal, a horizontal cut may be made across a wall by progressively raising or lowering jack 15 to compensate for the angle of the scaffold. It will be also understood from the foregoing that a cut of any angle may be made in the wall of a building since circular blade 19 may be rotated to any desired angle from 0 to 360 degrees relative to the horizontal. In addition, it will be understood that perfectly straight, accurate, and clean cuts may be made, which has not heretofore been possible. Also, it is apparent that the speed at which holes or cuts are made in vertical walls with the present invention is considerably greater than with heretofore known tools. Thus, there is no awkwardness in making a cut with the sawing apparatus of the present invention as there would be in trying to hold a portable saw against the side of a building and the needed power can be exerted easily by means of lever 156 to cut through tough stone, bricks, and the like. Heretofore, it has been practically impossible to cut through brick walls without chipping the bricks and necessitating a repair of the wall by bricklayers after cuts have been made, whereas, with the present invention, there is no need for bricklayers to smooth out the work after a hole has been cut. Furthermore, with previous known tools a cut could not be made in crowded places— for example, under window sills—and it was necessary to knock out that portion of the wall by means of a chisel or the like.

Actual tests conducted with the saw of the present invention have shown that the saw of the present invention can cut a hole in twenty minutes as compared with a time of two and one-half hours for cutting a comparable hole by previously known methods.

Figs. 7 through 11 illustrate a modified form of the means for vertically elevating power saw 17. The power saw 17 and supporting means 21 are the same as heretofore described for the preferred embodiment and a description of these parts will not be repeated. The only modification is in the elevating means. In this modified structure, horizontal rods 63, a short upper portion 166 of each of legs 65, and angle members 67 are retained but the portions of legs 65 below angle members 67 are omitted, as well as jack 15 and carriage 11. A rigid diamond-like framework 167 is provided to support each of rods 63 and each preferably includes a pair of braces 169 respectively rigidly attached to and extending in converging relationship from the lower ends of portions 166 to their points of rigid attachment respectively with vertical pieces 171. A pair of rollers 173, one disposed above the other, are rotatably mounted from each of vertical pieces 171 as by axles 175.

An arch-like frame structure 177 is provided for the modified construction of Figs. 7 through 11 and comprises an elongated base member 179 and a pair of upstanding inwardly facing and spaced channel members 181 having a pair of upwardly and inwardly diverging members 183 fixedly mounted adjacent the upper ends of channel members 181 with the members 183 being connected by a cross piece 185 to form the outline of the rigid frame. A pair of elongated flat supports 187 are respectively attached to channel member 181 adjacent the lower ends thereof and extend rearwardly therefrom in parallel relationship. A pair of cables 189, each provided with a turnbuckle 191 of usual construction, are respectively connected between the rearward ends of supports 187 and channel members 181 adjacent the upper ends thereof whereby to brace the channel members. Additionally, a third cable 193 extends from adjacent the upper end of one of channel members 181 to a point of attachment with a portion 195 of base 179 which extends laterally outwardly past channel member 181. Cable 193 also is provided with a turnbuckle 197 of usual construction. Cables 189, 193 are attached to the members heretofore described by suitable means, as eyelets 199. Base 179 extends past the other channel member 181 as at 201 in the direction opposite from the extension of portion 195. Frame structure 177 is adapted to rest on a supporting structure as a floor, the ground, or the like in front of the wall 31 to be cut, as best shown in Figs. 7, 8, and 9, with supports 187 extending away from the wall. A leveling screw 203 threadedly extends through portion 201 into engagement with the supporting structure whereby being adapted to be turned for leveling frame structure 177. In addition, a non-skid pad 204, formed of rubber or the like, is preferably provided on the bottom of supports 187 and base 179.

The pairs of rollers 173 on frameworks 167 respectively extend into channel members 181, as best shown in Figs. 10 and 11, with rollers 173 adapted to engage one of the inwardly extending flanges of the channel members.

Hoisting means is provided for raising and lowering the saw, which means preferably comprises a drum 205 of usual construction rotatably mounted from one of channel members 181 and having a handle 207 for turning the drum. A cable 208 attached at one end to drum 205 is adapted to be wound therearound. Cable 208 is reeved through a pulley 209 mounted from one of channel members 181 adjacent the upper part thereof and, thence, reeved through a second pulley 211 suspended from cross piece 185 and, thence, extends downwardly to a bridle 213, the ends of which are attached to frameworks 167. Thus, it will be understood that, by turning drum 205, the cable 208 may be reeled in or let out to cause raising or lowering of saw 17. Suitable ratchet means of well-known construction, not shown, is preferably provided to act in conjunction with drum 205 for holding cable 208 at the desired position.

It will be understood that this modified construction in Figs. 7 through 11 and hereinabove described is particularly adapted to cut a door opening in a vertical wall. It will also be understood that the operation and movements of power saw 17 are substantially the same as that heretofore described in the preferred embodiment, the only difference being in the vertical positioning of the saw—that is, instead of jack 15 and scafford 23 the saw is adjusted vertically by means of cable 208.

Although the invention has been described and illustrated with respect to a preferred embodiment thereof, it is to be understood that it is not to be so limited since changes and modifications may be made therein which are within the full intended scope of this invention as hereinafter claimed.

I claim:

1. Sawing apparatus for sawing a vertical surface comprising a power saw including a circular saw blade having an axis disposed substantially parallel to said vertical surface, drive means for rotating said saw about its axis, supporting means for supporting said power saw, said supporting means being so arranged and constructed that said power saw is rotatable about a second axis parallel to said blade and normal to said vertical surface so that said saw blade is adapted to cut said vertical surface at any angle, said supporting means being movably mounted for movement towards and away from said vertical surface, motion transmission means for moving said supporting means towards and away from said vertical surface to carry said power saw into and out of blade engaging relationship with said vertical surface, said power saw being freely rockably carried by said supporting means for unrestrained and quick movement over a substantial arc and in a manner so that rocking movement of said power saw is effective to rockably move said blade in a plane normal at any selected angle relative to said vertical surface, and handgrip means attached to said supporting means for rocking said blade to make a cut in said vertical surface.

2. Sawing apparatus for sawing a vertical surface comprising a power saw including a circular saw blade having an axis disposed substantially parallel to said vertical surface, drive means for rotating said saw about its axis, a frame, means movably holding said frame for vertical movement thereof, supporting means for supporting said power saw from said frame, said supporting means being so arranged and constructed that said power saw is rotatable about a second axis parallel to said blade and normal to said vertical surface whereby said saw blade is adapted to cut said vertical surface at any angle, said supporting means being movably mounted relative to said frame for movement towards and away from said vertical surface, motion transmission means interposed between said supporting means and said frame for moving said supporting means to carry said power saw into and out of blade engaging relationship with said vertical surface, said power saw being freely rockably carried by said supporting means for unrestrained and quick movement over a substantial arc and in a manner so that rocking movement of said power saw is effective to rockably move said blade in a plane normal at any selected angle relative to said vertical surface, and handgrip means attached to said supporting means for rocking said blade to make a cut in said vertical surface.

3. Sawing apparatus comprising a power saw including a substantially circular saw blade having an axis, drive means for rotating said blade about its axis, a frame, means movably holding said frame for vertical movement thereof, a substantially vertically disposed outer ring, said outer ring being movably mounted from said frame for axial movement relative to the axis of the outer ring, an inner ring disposed within said outer ring, said power saw being rockably mounted from said inner ring in a manner so that said saw blade is rockable in a plane perpendicular to its axis, said inner ring being rotatably mounted from said outer ring in a manner so that said saw blade with said inner ring is rotatable about a second axis parallel to the plane of said saw blade, and motion transmission means interposed between said frame and said outer ring for axial movement of said outer ring to carry said power saw back and forth therewith.

4. Sawing apparatus adapted to be carried by a scaffold for sawing a vertical surface adjacent the scaffold, said sawing apparatus comprising a carriage having depending wheels for rollingly engaging said scaffold, said wheels being arranged to permit said carriage to roll along said scaffold substantially parallel to said vertical surface, a frame mounted on said carriage, a power saw including a substantially circular saw blade having an axis disposed substantially parallel to said vertical surface, said power saw additionally including drive means for rotating said blade about its axis, supporting means for supporting said power saw from said frame, said supporting means being so arranged and constructed that said power saw is rotatable about a second axis parallel to said circular blade and normal to said vertical surface whereby said saw blade is adapted to cut said vertical surface at any angle, said supporting means being movably mounted relative to said frame for movement towards and away from said vertical surface, motion transmission means interposed between said supporting means and said frame for moving said supporting means to carry said power saw into and out of blade engaging relationship with said vertical surface, said power saw being freely rockably carried by said supporting means for unrestrained and quick movement over a substantial arc in a manner so that rocking movement of said power saw is effective to rockably move said blade in a plane normal at any selected angle relative to said vertical surface, and handgrip means attached to said supporting means for rocking said blade to make a cut in said vertical surface.

5. Sawing apparatus adapted to be carried by a scaffold for sawing a vertical surface adjacent the scaffold, said sawing apparatus comprising a carriage having depending wheels for rollingly engaging said scaffold, said wheels being arranged to permit said carriage to roll along said scaffold substantially parallel to said vertical surface, said carriage including upstanding hollow posts open at the upper ends thereof, a frame including legs respectively telescopically received in said posts for permitting the frame to move vertically, jack means interposed between said carriage and said frame for vertically moving said frame to change the height thereof, a power saw including a substantially circular saw blade having an axis disposed substantially parallel to said vertical surface, said power saw additionally including drive means for rotating said blade about its axis, supporting means for supporting said power saw from said frame, said supporting means being so arranged and constructed that said power saw is rotatable about a second axis parallel to said circular blade and normal to said vertical surface whereby said saw blade is adapted to cut said vertical surface at any angle, said supporting means being movably mounted relative to said frame for movement towards and away from said vertical surface, motion transmission means interposed between said supporting means and said frame for moving said supporting means to carry said power saw into and out of blade engaging relationship with said vertical surface.

6. The structure according to claim 5 which includes bracket means depending from said carriage for engaging said scaffold adjacent the bottom thereof and lifting means for lifting said carriage to carry said wheels out of engagement with said scaffold and to clamp said scaffold between said lifting means and said bracket means.

7. Sawing apparatus adapted to be carried by a scaffold for sawing a vertical surface adjacent the scaffold, said sawing apparatus comprising a carriage having depending wheels for rollingly engaging said scaffold, said wheels being arranged to permit said carriage to roll along said scaffold substantially parallel to said vertical surface, a frame mounted on said carriage, a power saw including a substantially circular saw blade having an axis disposed substantially parallel to said vertical surface, said power saw additionally including drive means for rotating said blade about its axis, an outer ring disposed transversely of the sawing apparatus in a plane substantially parallel to said vertical surface, said outer ring being movably mounted from said frame for movement towards and away from said vertical surface, an inner ring disposed within said outer ring, said power saw being rockably mounted from said inner ring and said inner ring being rotatably mounted from said outer ring in a manner so that said saw blade is rockable in a plane perpendicular to said vertical surface and said saw blade is adapted to be positioned at any angle relative to said vertical surface, and motion transmission means interposed between said frame and said outer ring for moving said outer ring to carry said power saw into and out of blade engagement with said vertical surface.

8. Sawing apparatus adapted to be carried by a scaffold for sawing a vertical surface adjacent the scaffold, said sawing apparatus comprising a carriage having depending wheels for rollingly engaging said scaffold, said wheels being arranged to permit said carriage to roll along said scaffold substantially parallel to said vertical surface, said carriage including upstanding hollow posts open at the upper ends thereof, a frame including legs respectively telescopically received in said posts for permitting the frame to move vertically, jack means interposed between said carriage and said frame for vertically moving said frame to change the height thereof, a power saw including a substantially circular saw blade having an axis disposed substantially parallel to said vertical surface, said power saw additionally including drive means for rotating said blade about its axis, an outer ring disposed transversely of the sawing apparatus in a plane substantially parallel to said vertical surface, said outer ring being movably mounted from said frame for movement towards and away from said vertical surface, an inner ring disposed within said outer ring, said power saw being rockably mounted from said inner ring and said inner ring being rotatably mounted from said outer ring in a manner so that said saw blade is rockable in a plane perpendicular to said vertical surface and said saw blade is adapted to be positioned at any angle relative to said vertical surface, and motion transmission means interposed between said frame and said outer ring for moving said outer ring to carry said power saw into and out of blade engagement with said vertical surface.

9. The structure according to claim 8 which includes bracket means depending from said carriage for engaging said scaffold adjacent the bottom thereof and lifting means for lifting said carriage to carry said wheels out of engagement with said scaffold and to clamp said scaffold between said lifting means and said bracket means.

10. Sawing apparatus for sawing a vertical surface comprising an arch-like frame structure including a pair of upstanding spaced inwardly facing channel members and means for bracing said channel members, a frame; hoisting means including a bridle attached to said frame, a pulley attached to said arch-like frame structure adjacent the upper part thereof, a cable attached adjacent one end thereof to said bridle and extending through said pulley, and drum means rotatably mounted from one of said channel members for reeling in and letting out said cable whereby said frame is adapted to be raised and lowered; said frame including two pairs of rollers respectively rollingly engaging said channel members to guide the frame when being raised and lowered, a power saw including a substantially circular saw blade having an axis disposed substantially parallel to said vertical surface, said power saw additionally including drive means for rotating said blade about its axis, supporting means for supporting said power saw from said frame, said supporting means being so arranged and constructed that said power saw is rotatable about a second axis parallel to said blade and normal to said vertical surface whereby said saw blade is adapted to cut said vertical surface at any angle, and motion transmission means interposed between said frame and said supporting means to carry said power saw into and out of blade engagement with said vertical surface.

11. Sawing apparatus for sawing a vertical surface comprising an arch-like frame structure, a frame including a pair of parallel spaced rods, hoisting means attached to said frame for the raising and lowering thereof, said frame including guide means for engaging said arch-like frame structure to guide the frame when being raised and lowered, a power saw including a substantially circular saw blade having an axis disposed substantially parallel to said vertical surface, said power saw additionally including drive means for rotating said blade about its axis, an outer ring disposed transversely of the sawing apparatus in a plane substantially parallel to said vertical surface, said outer ring being movably mounted from said rods for movement towards and away from said vertical surface, an inner ring disposed within said outer ring, said power saw being rockably mounted from said inner ring and said inner ring being rotatably mounted from said outer ring in a manner so that said saw blade is rockable in a plane perpendicular to said vertical surface and said blade is adapted to be positioned at any angle relative to said vertical surface, and motion transmission means interposed between said frame and said outer ring for moving said outer ring to carry said power saw into and out of blade engagement with said vertical surface.

12. Sawing apparatus for sawing a vertical surface comprising an arch-like frame structure including a pair of upstanding spaced inwardly facing channel members and means for bracing said channel members, a frame including a pair of parallel spaced rods, a drum rotatably mounted from one of said channel members; hoisting means including a bridle attached to said frame, a pulley attached to said arch-like frame structure adjacent the upper part thereof, a cable attached adjacent one end thereof to said bridle and extending through said pulley, and drum means for reeling in and letting out said cable whereby said frame is adapted to be raised and lowered; said frame including two pairs of rollers respectively rollingly engaging said channel members to guide the frame when being raised and lowered, a power saw including a substantially circular saw blade having an axis disposed substantially parallel to said vertical surface, said power saw additionally including drive means for rotating said blade about its axis, an outer ring disposed transversely of the sawing apparatus in a plane substantially parallel to said vertical surface, said outer ring being movably mounted from said rods for movement towards and away from said vertical surface, an inner ring disposed within said outer ring, said power saw being rockably mounted from said inner ring and said inner ring being rotatably mounted from said outer ring in a manner so that said saw blade is rockable in a plane perpendicular to said vertical surface and said blade is adapted to be positioned at any angle relative to said vertical surface, and motion transmission means interposed between said frame and said outer ring for moving said outer ring to carry said power saw into and out of blade engagement with said vertical surface.

13. Sawing apparatus comprising a power saw including a substantially circular saw blade having an axis, drive means for rotating said blade about its axis, a substantially vertically disposed outer ring, means for supporting said outer ring, an inner ring disposed within said outer ring, said power saw being freely rockably mounted from said inner ring in a manner so that said saw blade is rockable in a plane perpendicular to its axis for sawing a surface, said inner ring being rotatably mounted from said outer ring in a manner so that said saw blade with said inner ring is rotatable about a second axis parallel to the plane of said saw blade.

References Cited in the file of this patent

UNITED STATES PATENTS

| | | |
|---|---|---|
| 344,610 | Wright | June 29, 1886 |
| 1,354,831 | Jeffrey | Oct. 5, 1920 |